(12) United States Patent
Kito et al.

(10) Patent No.: US 8,820,562 B2
(45) Date of Patent: Sep. 2, 2014

(54) FILLER NECK

(71) Applicant: Toyoda Gosei Co., Ltd., Kiyosu (JP)

(72) Inventors: Hiroaki Kito, Kiyosu (JP); Atsushi Sekihara, Kiyosu (JP); Yoshinari Hiramatsu, Kiyosu (JP); Masashi Yamamoto, Kiyosu (JP); Noboru Hosoe, Kiyosu (JP); Hitoshi Uchida, Kiyosu (JP); Masayuki Kajioka, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 13/970,677

(22) Filed: Aug. 20, 2013

(65) Prior Publication Data

US 2014/0084005 A1    Mar. 27, 2014

(30) Foreign Application Priority Data

Sep. 24, 2012   (JP) .................................. 2012-209407

(51) Int. Cl.
- *B60K 15/04* (2006.01)
- *B60K 15/077* (2006.01)

(52) U.S. Cl.
CPC ........... *B60K 15/077* (2013.01); *B60K 15/0406* (2013.01)
USPC ........... 220/86.2; 220/378; 220/304; 222/478

(58) Field of Classification Search
CPC .................................................. B60K 15/0406
USPC ........ 220/86.2, 86.1, 304, DIG. 33, 745, 746, 220/378; 222/478, 251, 3; 137/383, 800, 137/560, 384
See application file for complete search history.

(56) References Cited

U.S. PATENT DOCUMENTS

| 4,300,699 | A | * | 11/1981 | Anhegger | ..................... 220/86.2 |
| 4,632,270 | A | * | 12/1986 | Sasaki et al. | ................. 220/86.2 |
| 8,096,332 | B2 | * | 1/2012 | Hagano | ......................... 141/285 |

FOREIGN PATENT DOCUMENTS

| JP | 3759981 B2 | 1/2006 |
| JP | 4356608 B2 | 8/2009 |

* cited by examiner

*Primary Examiner* — Robert J Hicks
*Assistant Examiner* — Kareen Rush
(74) *Attorney, Agent, or Firm* — Posz Law Group, PLC (57) ABSTRACT

A filler neck is equipped with a neck main body having a pipe shaped resin inner layer and resin outer layer, and a retainer made of metal mounted so as to cover the edge part of the neck main body. The resin inner layer and the resin outer layer are made of resin materials for which one layer has superior fuel permeability resistance to the other layer. The resin inner layer has a screw part for screwing into a screw part of a fuel cap on the inner wall of the resin inner layer. The retainer has a seal part for sealing between the gasket, and a round cylinder shaped outer circumference protector part. The lower end of the outer circumference protector part is on plane perpendicular to the center axis of the fuel path. The plane includes the screw part.

6 Claims, 6 Drawing Sheets

// FILLER NECK

This application claims the benefit of and priority from Japanese Application No. 2012-209407 filed Sep. 24, 2012, the content of which is incorporated herein by reference.

BACKGROUND OF THE INVENTION

1. Field of the Invention

The present invention relates to a filler neck having a fuel path for guiding fuel to a fuel tank.

2. Description of the Related Art

As a filler neck used for automobiles, a constitution using a pipe made of resin is disclosed in JP-T-3759981. The filler neck has a pipe main body which forms the fuel path and is made of a first resin material with high fuel permeability resistance, a ring shaped retainer made of metal mounted on the tip part of the pipe main body and forming a fueling port, and an adhesive resin layer made of a second resin material with good adhesivity interposed between the pipe main body and the retainer on both the resin material of the pipe main body and the retainer metal material. The retainer is equipped with a screw part, and by screwing the fuel cap on the screw part, the fueling port is closed by the fuel cap.

SUMMARY

However, with the filler neck of the technology described above, when the resin of the pipe main body is exposed to fuel and swells, the metal retainer peels from the pipe main body, and there is a loss of sealing properties in the gap. Because of this, there is the problem of requiring many man hours for selection of filler neck molding conditions and resin material and the like.

According to an aspect of the invention, the invention is provided with a filler neck having a fueling port sealed by a fuel cap, and a fuel path for guiding fuel discharged from a fueling nozzle inserted in the fueling port to a fuel tank. The filler neck comprises: a neck main body that has a pipe shaped resin inner layer forming the fuel path, and a resin outer layer laminated on an outer circumference surface of the resin inner layer; and a retainer that is made of metal, and mounted on the neck main body so as to cover an opening end part of the neck main body.

The resin inner layer has a first screw part formed on an inner wall of the resin inner layer, the first screw part engaging with a second screw part of the fuel cap, and the retainer has a seal part for sealing against a gasket of the fuel cap attached to the fueling port, and a round cylinder shaped outer circumference protector part that is bent to an outer circumference side from the seal part and covers an outside surface of the resin outer layer. A lower end of the outer circumference protector part is configured to extend to a position wherein the position is on a plane perpendicular to a center axis of the fuel path, and at least a part of the first screw part is disposed on the plane.

With this embodiment, the metal retainer is mounted on the neck main body so as to cover the opening end part of the neck main body. The retainer has a seal part, and that seal part is pressed by a fuel cap gasket to seal the space with the gasket. Also, the retainer has the resin outer layer covered from the outside by an outer circumference protector part bent from the seal part to the outer circumference side. The outer circumference protector part is in a planar form perpendicular to the center axis of the fuel path and is provided extending to the fuel tank side to reach at least a portion of the screw part. The outer circumference protector part suppresses deformation due to fuel swelling of the resin inner layer and resin outer layer, and also suppresses deformation of the upper part of the neck main body in relation to the external force received by the screw part.

(2) With the filler neck of the mode noted above, it is possible to have a constitution for which the aforementioned resin inner layer is made of polyamide, and the aforementioned outer layer is made of a polyethylene having a maleic acid functional group or an ethylene vinyl alcohol copolymer thermally welded to the aforementioned polyamide.

(3) With the filler neck of the mode noted above, a nozzle guide member is equipped for guiding the fueling nozzle and is arranged on the aforementioned fuel path, and the aforementioned nozzle guide member can have a constitution whereby it is held via a mechanical engaging mechanism on the inner wall of the aforementioned resin inner layer.

Another mode is a filler neck having a filler neck having a fueling port sealed by a fuel cap, and a fuel path for guiding fuel discharged from a fueling nozzle inserted in the fueling port to a fuel tank. The filler neck comprises: a neck main body that has a single layer made of a material; and a retainer that is made of metal, and mounted on the neck main body so as to cover an opening end part of the neck main body. The neck main body has a first screw part formed on an inner wall of the neck main body, the first screw part engaging with a second screw part of the fuel cap, and the retainer has a seal part for sealing against a gasket of the fuel cap attached to the fueling port, and a round cylinder shaped outer circumference protector part that is bent to an outer circumference side from the seal part and covers an outside surface of the neck main body. A lower end of the outer circumference protector part is configured to extend to a position, wherein the position is on a plane perpendicular to a center axis of the fuel path, and at least a part of the first screw part is disposed on the plane.

These and other objects, features, aspects, and advantages of the present invention will become more apparent from the following detailed description of the preferred embodiments with the accompanying drawings.

Figure 1:
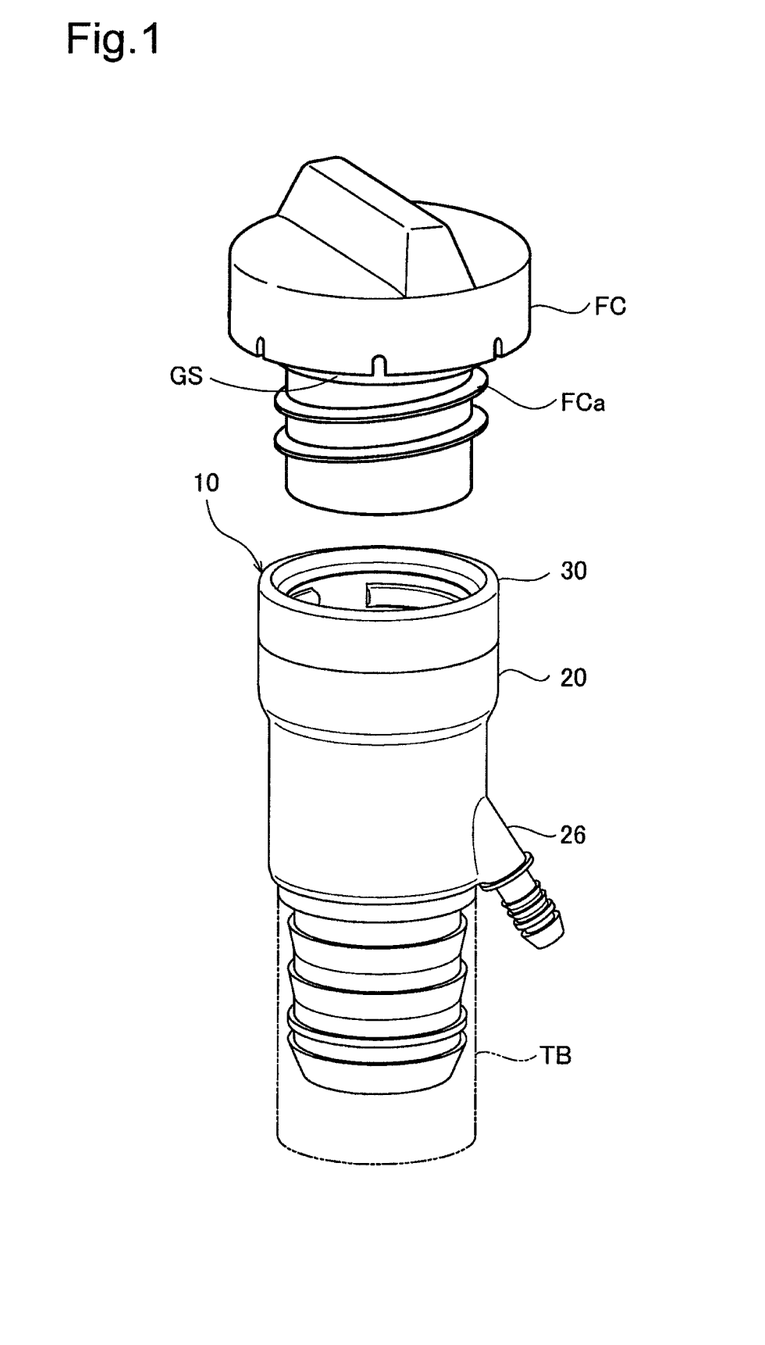
FIG. 1 is a perspective view showing a fueling device including the filler neck of the first embodiment of the present invention.

DESCRIPTION OF THE PREFERRED EMBODIMENTS (1) Constitution of the Fueling Device and Filler Neck FIG. 1 is a perspective view showing a fueling device including a filler neck 10 of the embodiment. The fueling device is a mechanism for supplying fuel to a fuel tank of an automobile (not illustrated). The fueling device is equipped with the filler neck 10, a tube TB connected to the bottom part of the filler neck 10, and a fuel cap FC mounted on the tip of the filler neck 10. With this constitution, when the user removes the fuel cap FC from the filler neck 10 and injects fuel inside the filler neck 10 using the fueling nozzle, the fuel is supplied to the fuel tank through a fuel path constituted by the filler neck 10 and the tube TB. Following, we will describe the constitution of each part.

Figure 2:
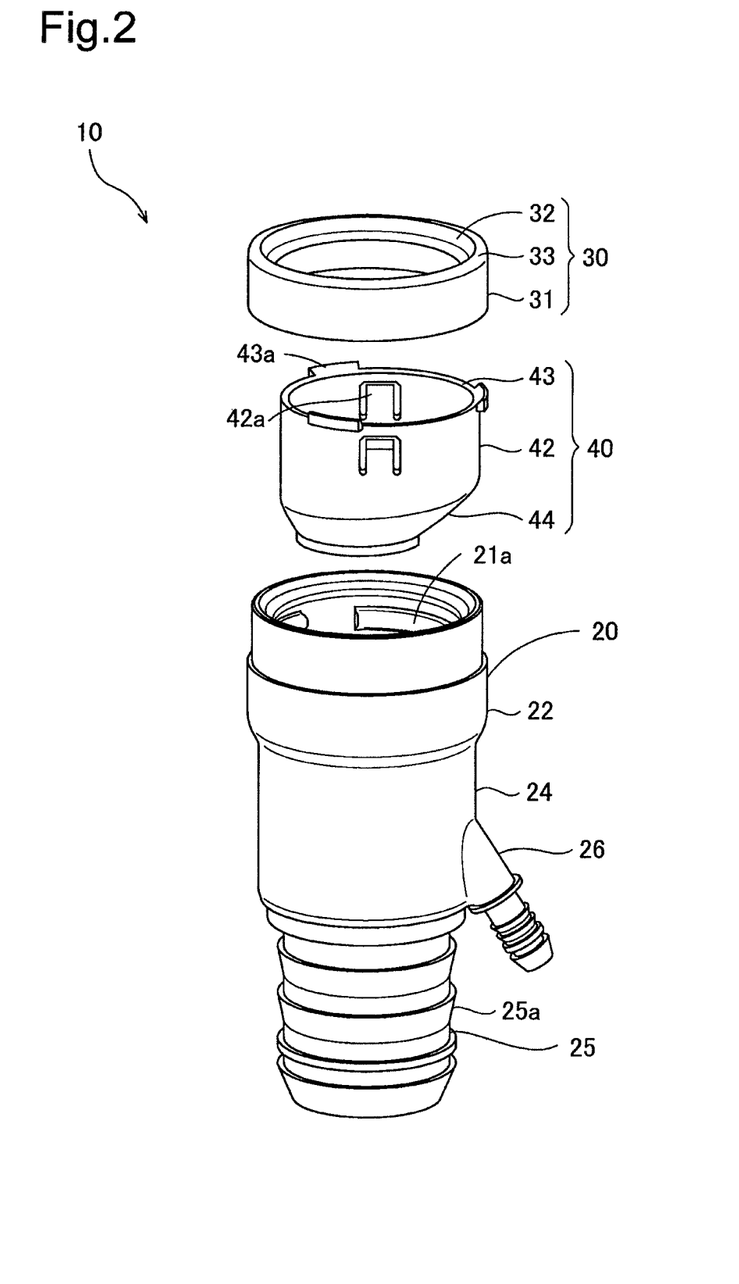
FIG. 2 is an exploded perspective view of the filler neck.
Figure 3:
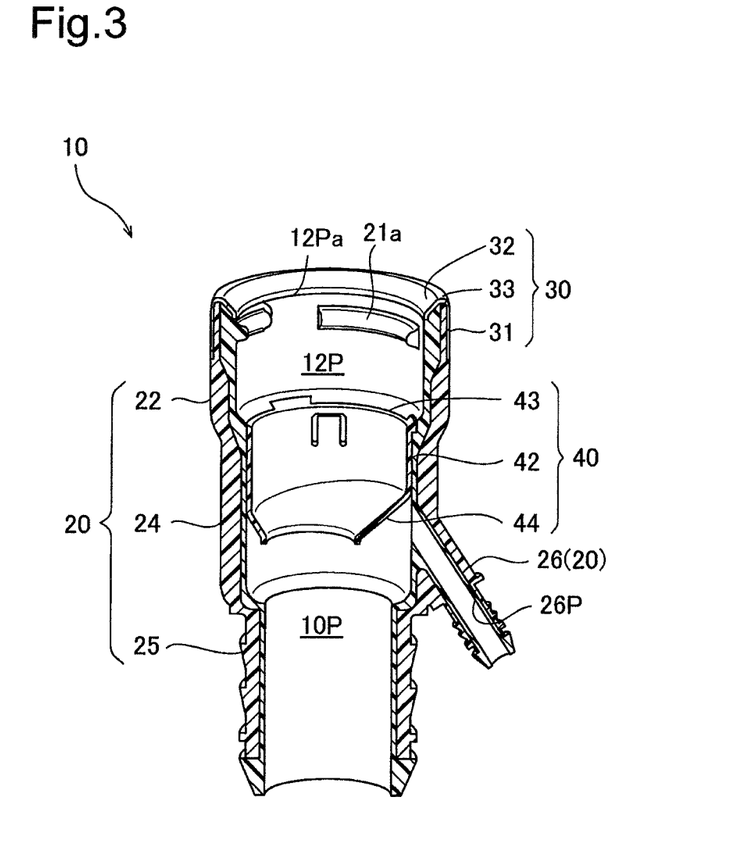
FIG. 3 is a cutaway perspective view of the filler neck.

FIG. 2 is an exploded perspective view of the filler neck 10. FIG. 3 is a cutaway perspective view of the filler neck 10. The filler neck 10 is a mechanism for sending fuel discharged from the fueling nozzle (not illustrated) to the fuel tank in a state for which a tube TB (see FIG. 1) is connected to its bottom edge. The filler neck 10 is equipped with a neck main body 20, a retainer 30, and a nozzle guide member 40. As shown in FIG. 3, the internal space of the filler neck 10 becomes a fuel path 10P. A portion of the fuel path 10P is partitioned by the nozzle guide member 40, and a fueling port 12Pa side is used as an insertion path 12P.

Figure 4:
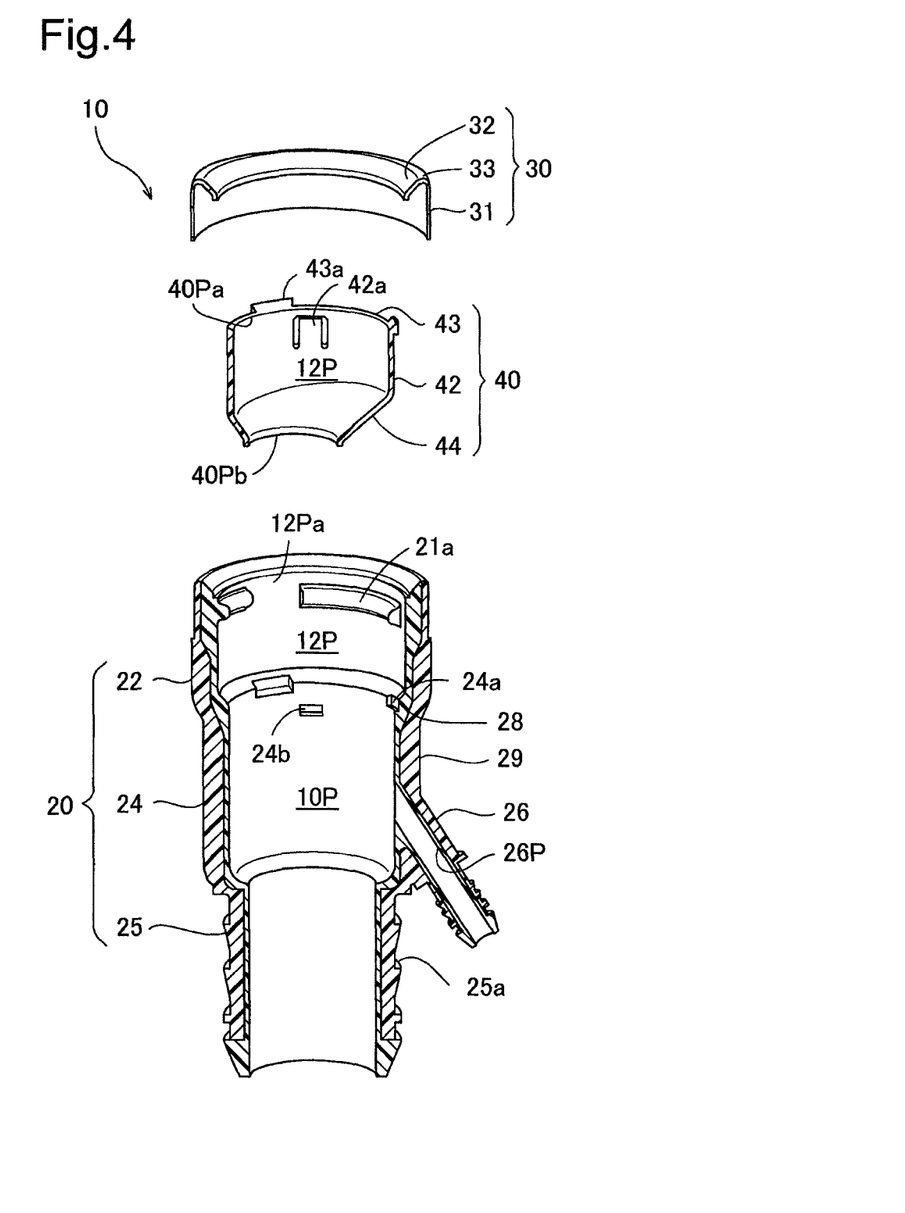
FIG. 4 is an exploded perspective view of each part of the filler neck of FIG. 3.

FIG. 4 is an exploded perspective view of each part of the filler neck 10. In FIG. 4, the neck main body 20 is formed by laminating two types of resin materials as will be described later. The neck main body 20 is equipped with a neck upper part 22, a neck junction part 24, a neck connecting part 25, and a breather tube 26.

The neck upper part 22 is a tube shaped member, and on its inner wall is equipped a screw part 21a provided projecting so as to screw into a screw part FCa of the fuel cap FC. The neck junction part 24 is a tube shaped member formed as an integral unit on the bottom part of the neck upper part 22, and the nozzle guide member 40 is mounted on its inner wall of the neck upper part 22. The neck junction part 24 is equipped with a step part 24a and an engaging hook 24b for retaining the nozzle guide member 40. The neck connecting part 25 is a tube unit formed as an integral unit that reduces in diameter at the bottom part of the neck junction part 24 and constitutes a portion of the fuel path 10P, and a ring shaped projecting part 25a is formed on its outer circumference part. The tube TB (FIG. 1) is inserted in the neck connecting part 25, and in a state with the tube TB held in by the ring shaped projecting part 25a, the neck connecting part 25 is connected to the fuel tank.

The breather tube 26 is a tube branching from the side wall of the neck junction part 24, and its inside is a breather path 26P. The breather path 26P has fueling performed smoothly by returning fuel vapor inside the fuel tank during fueling to the filler neck 10.

The neck main body 20 is constituted by laminating two types of resin material. The neck main body 20 is equipped with the fuel path 10P facing a resin inner surface 28, and a resin outer layer 29 laminated on the outer surface of the resin inner layer 28. The resin inner layer 28 is made of a resin material with excellent fuel permeability resistance, for example a polyamide (PA) such as nylon or the like, or an ethylene vinyl alcohol copolymer (EVOH) or the like, and mainly acts as a barrier layer that inhibits penetration of fuel. The resin outer layer 29 is made of a resin material excellent in mechanical strength, for example polyethylene (PE) or the like, and mainly acts as a layer to ensure the mechanical strength and impact resistance of the neck main body 20. When using polyethylene for the resin outer layer 29, it is possible to use a resin material (denatured polyethylene) which underwent maleic acid denaturing as the polar functional group. The denatured polyethylene is joined by chemical adhesion with PA, so is adhered to the resin inner layer 28.

Figure 5:
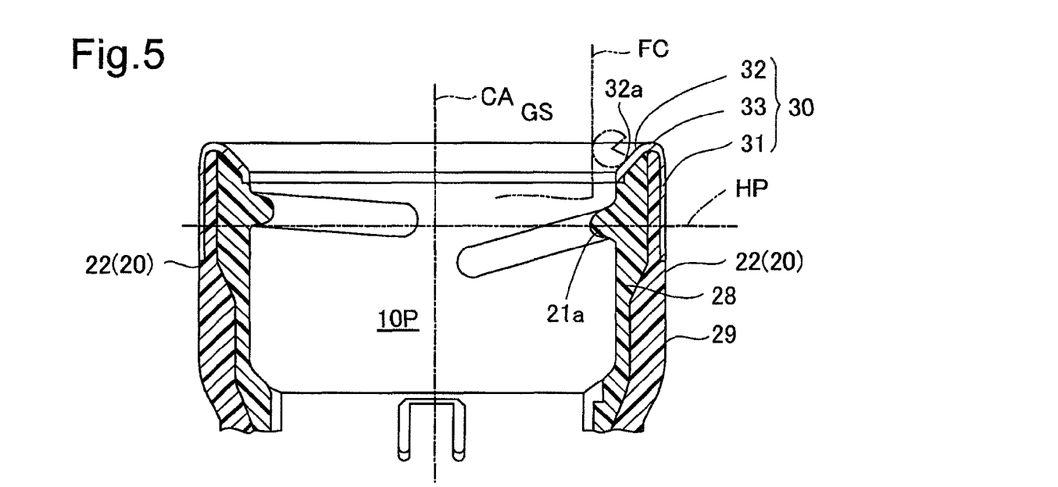
FIG. 5 is an enlarged cross section view showing the upper part of the neck.

FIG. 5 is an enlarged cross section view showing the neck upper part 22. The retainer 30 is mounted on the neck upper part 22. The retainer 30 is a ring shaped member for increasing the sealing properties against the gasket GS of the fuel cap FC, and also for increasing the mechanical strength of the neck upper part 22. The retainer 30 is formed by press forming a thin plate of metal such as stainless steel or the like. The retainer 30 is equipped with an outer circumference protector part 31, a seal part 32, and a junction part 33 for joining the outer circumference protector part 31 and the seal part 32.

The outer circumference protector part 31 is a round cylinder shape connected to the outer circumference surface of the resin outer layer 29 of the neck upper part 22 of the neck main body 20. When the neck upper part 22 is swollen by fuel, the outer circumference protector part 31 regulates diameter expansion and deformation of the neck upper part 22 by pressing from the outer circumference surface side of the neck upper part 22. The lower end of the outer circumference protector part 31 extends to a position downward from a surface HP that includes the screw part 21a, so applied resistance force to the force applied to the screw part 21a.

The seal part 32 is formed by bending in the center axis CA direction via the junction part 33 from the outer circumference protector part 31, and has a slanted seal surface 32a. In a state with the fuel cap FC closing the fueling port 12Pa, the seal surface 32a seals the fuel path 10P in relation to the outside by being pressed by the gasket GS of the fuel cap FC.

In FIG. 4, the nozzle guide member 40 is a member for guiding the fueling nozzle in the fuel path 10P, and is mounted via a mechanical engaging mechanism to inside the neck main body 20. The nozzle guide member 40 is equipped with a guide main body 42, a flange 43 formed on the upper part of the guide main body 42, and a guide diameter reduction part 44 formed on the lower part of the guide main body 42. The nozzle guide member 40 is formed by injection molding using a resin material such as polyacetal (POM) or the like. The inside space of the nozzle guide member 40 constitutes a portion of the insertion path 12P, and its upper part becomes an opening 40Pa while the bottom part becomes an opening 40Pb. The engaging mechanism is equipped with engaging hooks 42a formed on the guide main body 42, and engaging step parts 43a formed on the flange 43. The engaging hooks 42a engage with the engaging hooks 24b formed on the inner wall of the neck main body 20, and by the engaging step parts 43a fitting with the step part 24a, the nozzle guide member 40 is mounted inside the neck junction part 24.

(2) Manufacturing Method of the Filler Neck 10

The manufacturing of the filler neck 10 may be applied to a process as noted hereafter. First, the retainer 30 is formed in advance by press forming using a metal thin plate. The nozzle guide member 40 is formed by injection molding.

With the retainer 30 as an insert member, the neck main body 20 is manufactured by performing two colors of injection molding using two types of resin material. The retainer 30 is set in a metal cavity, denatured polyethylene is injected to form the resin outer layer 29 as the initial resin material, and after that, polyamide is injected to form the resin inner layer 28. The denatured polyethylene is a resin material for which a polar functional group, for example a maleic acid denatured functional group, is added to polyethylene (PE), and undergoes reactive adhesion with the polyamide (PA) by the heat during injection molding. Thus, the resin inner layer 28 and the resin outer layer 29 are welded as an integral unit by reactive adhesion using two-color molding. At this time, the resin that forms the resin inner layer 28 and the resin outer layer 29 are adhered with the retainer 30 by heat.

(3) Operation and Effect of the Embodiment (3)-1 As shown in FIG. 5, the retainer 30 has the outer circumference protector part 31 that covers the outer circumference part of the neck upper part 22. The lower end of the outer circumference protector part 31 extends over the plane perpendicular to the center axis CA of the fuel path 10P. The plane HP includes the screw part 21a, so the outer circumference protector part 31 suppresses deformation due to fuel swelling of the resin inner layer 28 and the resin outer layer 29, and also suppresses deformation of the neck upper part 22 against external force received by the screw part 21a.

(3)-2 With the neck main body 20, the resin inner layer 28 and the resin outer layer 29 are formed using different resin materials. The resin inner layer 28 is formed with nylon which is excellent in fuel permeability resistance, and the resin outer layer 29 is formed with polyethylene which is excellent in mechanical strength, so the resin inner layer 28 enclosing the fuel path 10P is able to reduce the emission of fuel to the outside, and the resin outer layer 29 exposed to the outside is able to show resistance force to large deformation in relation to impact imposed from outside.

(3)-3 The resin outer layer 29 is made of denatured polyethylene. Denatured polyethylene is a resin material for which a polar functional group, for example a maleic acid denatured functional group, is added to polyethylene (PE), and is a material which undergoes reactive adhesion with polyamide (PA) by heat during injection molding. Thus, the resin inner layer 28 and the resin outer layer 29 are welded to form an integrated unit at the interface of these by reactive adhesion when injection molding is done by two-color molding. Since the interface of the resin inner layer 28 and the resin outer layer 29 are adhered, it is possible to increase the fuel permeability resistance between them. Also, in doing two-color molding, after polyethylene is injected, high temperature polyamide is injected, so it is possible to increase the adhesive properties of both materials.

(3)-4 The seal part 32 of the retainer 30 is made of metal, so even if the fueling nozzle touches the seal part 32, the surface of the seal part 32 is not easily damaged, making it possible to maintain a high level of sealing properties.

(3)-5 The filler neck 10 is formed by injection molding of a resin material that forms the resin inner layer 28 and the resin outer layer 29 with the retainer 30 as an insert member, so the inner surface of the retainer 30 and the resin inner layer 28 and the resin outer layer 29 are adhered by heat, and it is possible to obtain excellent sealing properties between them.

(3)-6 The screw part 21a is formed with resin, so even if the screw part 21a has a complex shape, by forming press metal or the like, it is possible to form with high dimensional precision. In fact, the screw part 21a is formed as an integral unit as a portion of the resin inner layer 28 using polyamide with a lower fuel swelling than polyethylene, so the deformation is small even when the external force of the fuel cap FC is received. Excellent opening and closing operability of the fuel cap FC is maintained over the long term.

(4) Other Embodiments

Figure 6:
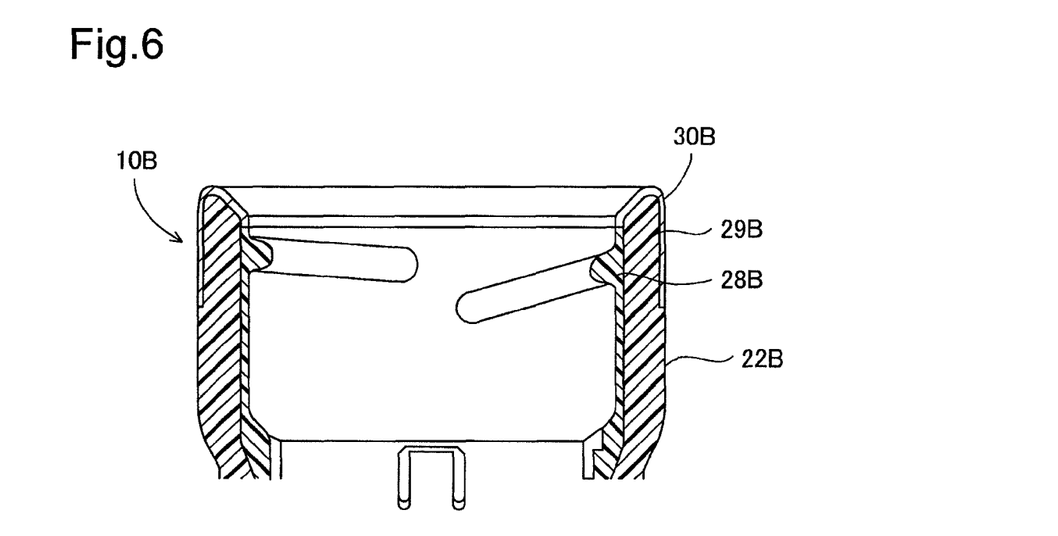
FIG. 6 is a cross section view showing the upper part of the filler neck of the second embodiment.

FIG. 6 is a cross section view showing the upper part of a filler neck 10B of the second embodiment. This embodiment's characteristic feature is in a constitution using the resin inner layer 28B and the resin outer layer 29B. Specifically, the resin inner layer 28B is made of the inner circumference bottom edge of the retainer 30B. The resin outer layer 29B is laminated on the resin inner layer 28B so as to adhere the entire retainer 30B. With this constitution, as the resin material of the resin outer layer 29B, by using a resin material that has excellent adhesive properties with the metal that forms the retainer 30B, it is possible to increase the sealing properties between the retainer 30B and the resin outer layer 29B.

Figure 7:
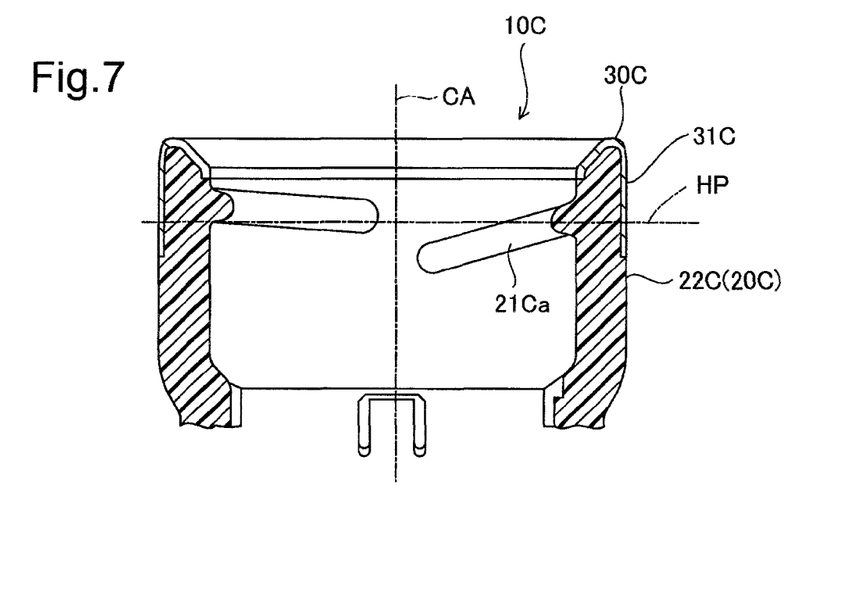
FIG. 7 is a cross section view of the upper part of the filler neck of the third embodiment.

FIG. 7 is a cross section view showing the upper part of a filler neck 10C of the third embodiment. This embodiment is characterized by a constitution for which the neck main body 20C is formed using a single resin. With this embodiment, The lower end of the outer circumference protector part 31C of the retainer 30C extends on a plane perpendicular to the center axis CA of the fuel path. The plane HP includes the screw part 21Ca, so deformation due to fuel swelling of the neck upper part 22C of the neck main body 20C is suppressed, and deformation of the neck upper part 22C is suppressed even against external force received by the screw part 21Ca. Also, as the resin for forming the neck main body 20C, in addition to polyethylene or polyamide, may be used various resin materials that are excellent in fuel permeability resistance and mechanical strength.

Figure 8:
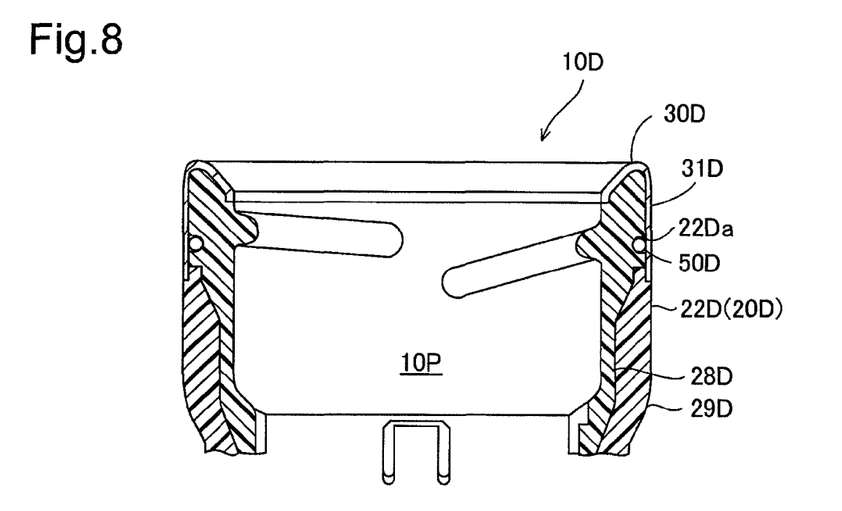
FIG. 8 is a cross section view of the upper part of the filler neck of the fourth embodiment.

FIG. 8 is a cross section view showing the upper part of a filler neck 10D of the fourth embodiment. This embodiment's characteristic feature is a constitution for which the sealing properties between a neck main body 20D and a retainer 30D is increased. The neck main body 20D is equipped with a first resin layer 28D constituting a fuel path 10P and a second resin layer 29D laminated on the outer circumference layer of the first resin layer 28D. The first resin layer 28D is made of polyamide which is excellent in fuel permeability resistance. The second resin layer 29D is made of polyethylene which is excellent in mechanical strength. The first resin layer 28D constitutes the top edge part of the neck main body 20D, and the retainer 30D is mounted on that top edge part. The second resin layer 29D is laminated so as to cover the outer circumference part of the first resin layer 28D from the bottom edge of the outer circumference protector part 31D of the retainer 30D. A ring shaped recess 22Da is formed on the outer circumference part of the first resin layer 28D of the neck upper part 22D. An O-ring 50D constituting the seal member is housed in the ring shaped recess 22Da. The O-ring 50D is interposed between the first resin layer 28D and the retainer 30D and seals between them. This embodiment is able to further prevent leaking of fuel gas to the outside from the fuel path 10P by increasing the sealing properties between the neck upper part 22D and the retainer 30D.

Since the O-ring 50D is mounted on the first resin layer 28D with excellent fuel permeability resistance, so compared to a constitution for which the seal member is mounted on the second resin layer 29D, it is possible to increase the sealing properties against the retainer 30D.

Note that the present invention is not limited by the modes, embodiments, or modification examples described above, and it is possible to be realized with various constitutions in a range that does not stray from its gist. For example, with the embodiments noted above, a resin material with excellent fuel permeability resistance such as polyamide or the like is used for the resin inner layer 28, and polyethylene is used for the resin outer layer 29, but the invention is not limited to this, and it is also possible to change all or part of the resin material of each layer as appropriate.

With the embodiments noted above, the retainer is adhered to the neck main body using the heat of fused resin material of the neck main body in the insert molding, but the invention is not limited to this, and it is also possible to heat both the edge part of the neck main body and the retainer after molding of the neck main body and thereby thermally adhering both members by pressing them.

With the embodiments noted above, as shown in FIG. 5, a constitution is described for which the fuel tank side edge part of the outer circumference protector part 31 of the retainer 30 is on a plane to perpendicular to the center axis CA of the fuel path 10P. The lower end of the outer circumference protector part 31 extends to a position past the screw part 21a, but the invention is not limited to this, and it is also possible to be constituted such that when the neck upper part has a plurality of screw threads on the neck upper part, the outer circumference protector part is provided extending to the fuel tank side to reach at least a portion of the screw threads.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A filler neck having a fueling port and a fuel path for guiding fuel discharged from a fueling nozzle inserted in the fueling port to a fuel tank, the filler neck comprising:
   a neck main body that has a pipe shaped resin inner layer forming the fuel path, and a resin outer layer laminated on an outer circumference surface of the resin inner layer; and
   a retainer that is made of metal and mounted on the neck main body so as to cover an opening end part of the neck main body, wherein
   the resin inner layer and the resin outer layer are made of resin materials for which one layer has superior fuel permeability resistance to the other layer,
   the resin inner layer has a screw part formed on an inner wall of the resin inner layer, and
   the retainer has a seal part attached to the fueling port and a round cylinder shaped outer circumference protector part that is bent to an outer circumference side from the seal part and covers an outside surface of the resin outer layer, and
   a lower end of the outer circumference protector part of the retainer is configured to extend to a position arranged on a plane perpendicular to a center axis of the fuel path, and at least a part of the screw part of the resin inner layer is disposed on the plane.

2. The filler neck according to claim 1 wherein
   the resin inner layer is made of polyamide, and
   the resin outer layer is made of one resin selected from a polyethylene having a maleic acid functional group thermally welded to the polyamide and an ethylene vinyl alcohol copolymer.

3. The filler neck according to claim 2, further comprising a nozzle guide member for guiding a fueling nozzle inserted into the fuel path, wherein the nozzle guide member is held via a mechanical engaging mechanism on the inner wall of the resin inner layer.

4. The filler neck according to claim 1, further comprising a nozzle guide member for guiding a fueling nozzle inserted into the fuel path, wherein the nozzle guide member is held via a mechanical engaging mechanism on the inner wall of the resin inner layer.

5. A filler neck having a fueling port and a fuel path for guiding fuel discharged from a fueling nozzle inserted in the fueling port to a fuel tank, the filler neck comprising:
   a neck main body that has a single layer made of a material; and
   a retainer that is made of metal and mounted on the neck main body so as to cover an opening end part of the neck main body, wherein
   the neck main body has a screw part formed on an inner wall of the neck main body, and
   the retainer has a seal part attached to the fueling port and a round cylinder shaped outer circumference protector part that is bent to an outer circumference side from the seal part and covers an outside surface of the neck main body, and
   a lower end of the outer circumference protector part is configured to extend to a position arranged on a plane perpendicular to a center axis of the fuel path, and at least a part of the screw part of the neck main body is disposed on the plane.

6. The filler neck according to claim 5, further comprising a nozzle guide member for guiding a fueling nozzle inserted into the fuel path, wherein the nozzle guide member is held via a mechanical engaging mechanism on the inner wall of the neck main body.

* * * * *